Figure 1:
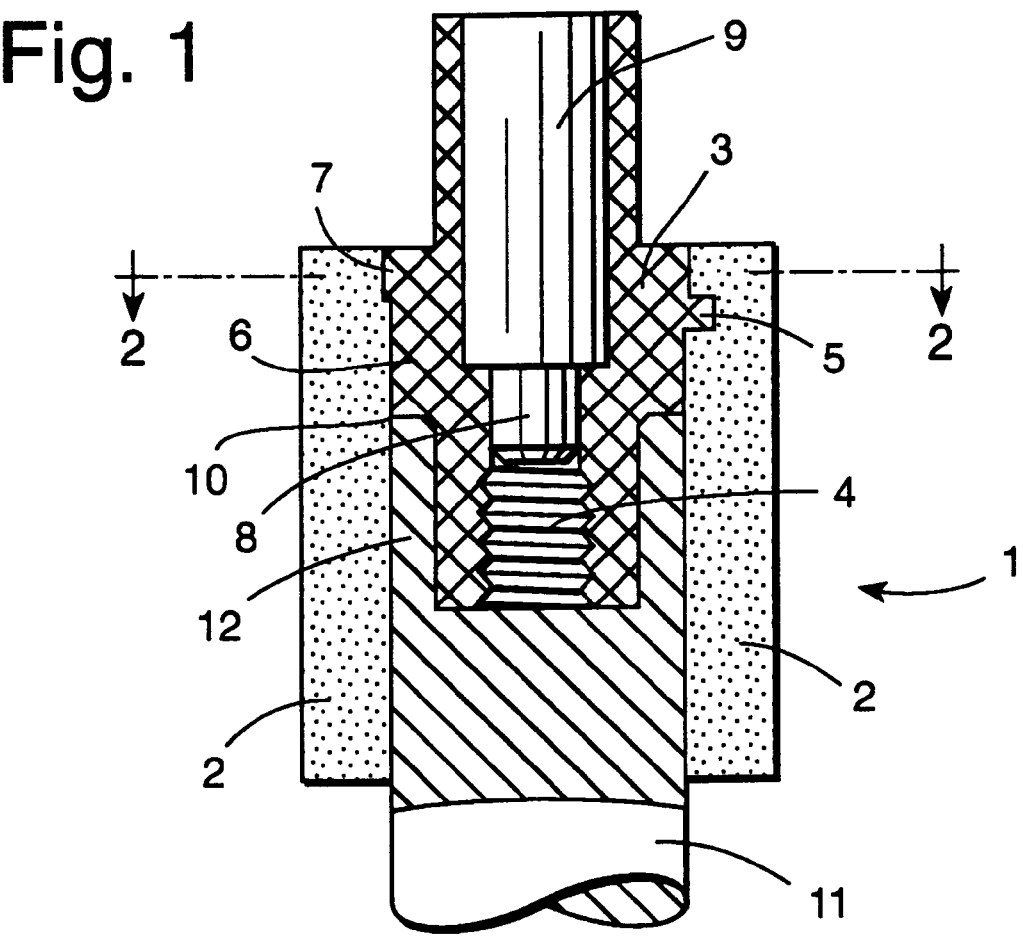

United States Patent [19]
Goltz et al.

[11] Patent Number: 5,945,758
[45] Date of Patent: Aug. 31, 1999

[54] ROTOR FOR AN ELECTRIC MOTOR

[75] Inventors: Jürgen Goltz, Langenfeld; Alfred Heinrich, Bergisch Gladbach, both of Germany

[73] Assignee: Max Baermann GmbH, Germany

[21] Appl. No.: 09/057,484

[22] Filed: Apr. 9, 1998

[30] Foreign Application Priority Data

Apr. 10, 1997 [DE] Germany .......................... 197 14 780

[51] Int. Cl.⁶ .................................................. H02K 5/16
[52] U.S. Cl. .......................... 310/90; 310/90; 310/90.5; 310/156
[58] Field of Search ............................. 310/90, 90.5, 156

[56] References Cited

FOREIGN PATENT DOCUMENTS

| | | |
|---|---|---|
| 124453 | 2/1977 | Germany . |
| 295 00 984 | 5/1995 | Germany . |
| 195 31 861 A1 | 3/1997 | Germany . |

*Primary Examiner*—Nestor Ramirez
*Assistant Examiner*—Thanh Lam
*Attorney, Agent, or Firm*—Nixon & Vanderhye P.C.

[57] ABSTRACT

The invention relates to a rotor (1) for an electric motor showing a hub (2) which is connected to a magnet (2). In order to avoid deformations of the inside thread (4) located in the hub (3), the hub (3) is spaced from the surrounding magnet (2) and is protected against deformations by means of inserting a core (11) during the magnet (2) is injection-molded.

11 Claims, 1 Drawing Sheet

U.S. Patent

Aug. 31, 1999

5,945,758

ROTOR FOR AN ELECTRIC MOTOR

The invention relates to a ROTOR FOR AN ELECTRIC MOTOR showing an outside located magnet which is provided with an opening and inside this opening a hub is located which is connected to the magnet and equipped with an inside thread. Further, the invention relates to a procedure for manufacturing a rotor according to invention.

The use of such hubs for rotors in electric motors is adequately known. For example, the rotor for a synchronous motor as disclosed in the German patent PS 32 38 674 shows a hub with a frictional connection to a ring magnet by means of a particularly designed gear cutting. The disadvantage of such rotor is that for the exact insertion of the hub into the magnet a very low process tolerance is required. Further, it is of disadvantage that deformations may occur with the hub when pressing it into the magnet, this may even lead to the rotor becoming unusable.

In addition, a procedure for manufacturing a rotor for an electric motor is known with which a plastic-bonded magnet is injection-molded around the hub. Such a manufacturing procedure involves the disadvantage for a rotor that by means of the injection pressure deformations of the hub may occur within the area of the inside thread.

Proceeding from this state of the art, the invention is based on the task to show a rotor and a procedure for its manufacturing with which the inside thread of the hub is effectively protected against damage or deformation through the magnet during manufacturing and use.

According to invention, the task is solved by the fact that with a rotor of the kind as described at the beginning the outside diameter of the hub, at least in the area of the inside thread, is smaller than the inside diameter of the opening of the magnet in this area.

Due to such layout, the part of the hub which is susceptible to deformations and damage, i.e. the area of the inside thread, is spaced by means of the surrounding magnet. Such spacing of hub and magnet avoids any force being transmitted from the magnet to the hub. Further, a rotor of such layout shows the advantage that even though forces have an effect on the hub, the inside thread, which serves as a moving thread, cannot be deformed.

In an advantageous version, the magnet of the rotor shows inside radial cavities in the area where it is connected to the hub, and the projections of the hub are at least partially in gear with these cavities. By using such projections, the hub is torsionfixed connected to the magnet.

A torsion-fixed connection can also be achieved by equipping the hub with cavities which are being filled when magnetic material is injection-molded around the hub.

In a preferable version, the hub shows an area with a cylinder-shaped inside wall adjoining the inside thread in axial direction. The diameter of this area is of the same or slightly larger size than the outside diameter of the inside thread. By means of the wider diameter of the area adjoining the inside thread a friction with an axis located in the hub is avoided. In general, the cylinder-shaped part of the hub can by laid-out with a diameter of any size or be tapered towards the inside thread. With the cylindrical part being designed that way, an easier removing of the hub from the injection-moulding machine can be achieved.

further, this area may be adjoined in axial direction by a second area showing a widened inside diameter against the outside diameter of the inside thread. the step located between the two areas can be used as a stopping face in case a threaded spindle with an appropriate stepped-cone widening is lead through the hub.

Appropiately, the magnet shows two sections with different inside diameters in the are where it is connected to the hub. Due to such shaping, the hub is additionally secured in axial direction against a displacing within the magnet.

In a preferred formation of the invention, the hub is made plastic. A threaded spindle is lead through the hub which is equipped with a moving thread. Here, plastic proves to be a particularly suitable material, showing advantageous properties as a good friction partner for various materials a threaded spindle can be made of. Especially with the use of a moving thread it is of importance to avoid deformations and damage to ensure a smooth running behaviour of the rotor and the threaded spindle. In order to improve the thermal and mechanical properties of the plastic employed, filling agents may also be used. The friction behaviour, the thermal conductivity and the vibration absorbing of the plastic can be influenced favourably by employing filling agents. Besides, the production of a plastic hub is particularly low in cost and thus is very suitable for a volume production.

Just as well, the magnet can be laid-out as a plastic-bonded magnet. Such plastic-bonded magnets can easily be produced by injection molding at low costs. Furthermore, the magnet can consist of isotropic or anisotropic magnetic material. If the material is anisotropic, the magnet is magnetized directly in the tool.

The task is solved by a procedure for manufacturing a rotor according to invention, too. With this procedure, the hub is placed into a core before being surrounded by the injection-molded magnetic material. The core encloses the hub in the area of the inside thread in the form of a hollow cylinder, with the inside diameter of the hollow cylinder basically corresponding to the outside diameter of the hub in the area of the inside thread. After the magnet has been injection-molded, the core is removed from the magnet. The space between the hub in the area of the inside thread and the surrounding magnet is given by the thickness of the wall of the hollow cylinder. With this procedure of manufacturing a rotor, the injection pressure does not transmit any force to the hub. Due to the fact that the area of the inside thread of the hub is spaced from the magnet, it is not possible to transmit the injection pressure directly to the hub, and accordingly deformations of the hub and the inside thread are avoided.

A PREFERRED VERSION IS DESCRIBED IN THE FOLLOWING FIGURES

FIG. 1 Showing the cross section A—A through a rotor according to invention

Figure 2:
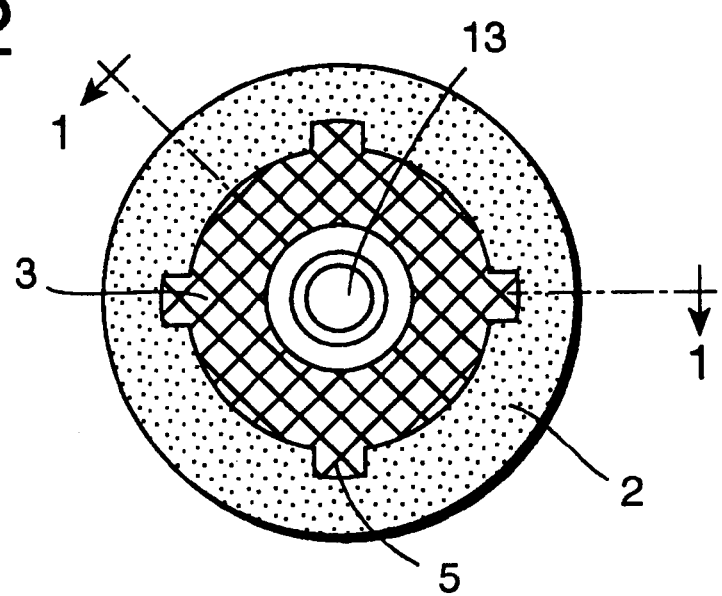

FIG. 2 Showing the cross section B—B of the rotor according to invention

The rotor 1 shows an outside located cylindrical magnet 2 and a hub 3 which is partially located in this magnet. Here, the hub 3 is partially projecting in axial direction out of the opening 13 of the magnet 2, with the projecting part of the hub being laid-out as a hollow cylinder. The outside diameter of the projecting part of the hub is, as shown in FIG. 1, smaller than the inside diameter of the magnet 2 at the relevant end of the magnet 2.

At the end of the hub 3 which is located within the magnet, the hub is equipped with a moving thread 4 through which a threaded spindle may be lead. In the area of the moving thread 4 the hub 3 is cylinder-shaped and shows a constant space to the inside surface of the magnet 2.

With a rotation of the rotor 1, the threaded spindle is moved in axial direction through the areas 8 and 9. The step which is located between the areas 8 and 9 can serve as a stopping face for a widening of the threaded spindle. The inside diameter of area 8 corresponds to the outside diameter of the moving thread 4, whereas the inside diameter of area 9 is wider than the outside diameter of the moving thread 4.

The hub 3 is torsion-fixed connected to the magnet 2 by means of the projections 5. The projections 5 radially project out of the hub 3 and are completely surrounded by the magnet 2. Such an arrangement of the projections 5 in the magnet 2 is only possible through surrounding the hub 3 which is equipped with the projections 5 by means of injection molding.

The hub 3 shows different radii in the sections 6 and 7 adjoining the magnet 2 by means of which the hub 3 is secured in axial direction against a displacing.

The core 11, as additionally shown in FIG. 1, serves with its hollow cylinder 12 to protect the inside thread 4 against the injection pressure when the hub 3 is being surrounded by the injection-molded magnet 2. For this purpose, the hub 3 is placed into the core 11 before it is surrounded by the plastic-bonded magnet through injection molding.

As can be seen from FIG. 1, the inside diameter of the core 11 corresponds to the outside diameter of the hub in the area of the inside thread 4 thus, the hub 3 can be placed exactly into the core 11. The face of the hollow cylinder wall 12 supports the step 10 of the hub 3 during the magnet 2 is injection-molded.

We claim:

1. A rotor for an electric motor comprising:

an external magnet which includes a cylindrical wall defining a central opening having an inside diameter;

an interior hub connected to the magnet and coaxially located within said central opening so that one end thereof projects outwardly from said opening, wherein said hub has another end, opposite to said one end, which is located inside said central opening of said magnet and includes an inside thread; and wherein said hub has an outside diameter at least in a region adjacently surrounding said inside thread thereof which is smaller than the inside diameter of the central opening of the magnet.

2. The rotor according to claim 1, wherein said magnet includes inside cavities which extend radially outwardly from said central opening, and wherein said hub includes projections which are received by respective said cavities so as to connect said hub to said magnet.

3. The rotor according to claim 1, wherein said hub includes a cylindrically-shaped first interior wall region which is coaxially adjacent said inside thread, wherein said first interior wall region has an interior diameter which is the same or larger than an outside diameter of the inside thread.

4. The rotor according to claim 3, wherein said hub further includes a second interior wall region which is coaxially positioned relative to said interior thread and said first interior wall region so that said first interior wall region is between said interior thread and said second interior wall region, and wherein said second interior wall region has a diameter which is greater than said first interior wall region and said outer diameter of said interior thread.

5. The rotor according to claim 1, wherein said hub includes first and second cylindrically-shaped exterior sections with different diameter.

6. The rotor according to claim 1, wherein said hub is made of a plastics material.

7. The rotor according to claim 1, wherein said magnet is a plastic-bonded magnet.

8. The rotor according to claim 7, wherein said magnet consists essentially of isotropic magnetic material.

9. The rotor according to claim 7, wherein said magnet consists essentially of anisotropic magnetic material.

10. A process for producing a rotor for an electric motor having an interior hollow hub which includes one end region having a lesser diameter as compared to an external hub diameter, and having an interior thread, said process comprising the steps of:

(a) placing said one end of said hub into a cylindrically recess defined by a cylindrical end wall of a core member having an exterior diameter corresponding to said hub diameter and an interior diameter corresponding to said exterior diameter of said one end region in such a manner that said one end region is surrounded by said cylindrical end wall; and then (b) forming an external magnet which surrounds said one end of said hub by injection-molding a magnetic plastics material around said hub and said core member to form a cylindrical magnet therearound.

11. The process of claim 10, which further comprises (c) removing said core member from said hub to thereby leave an annular space defined between said one end of said hub and said external magnet.

\* \* \* \* \*